United States Patent [19]

Kaiser et al.

[11] Patent Number: 4,924,399
[45] Date of Patent: May 8, 1990

[54] VEHICLE CONTROL SYSTEM WITH HSO-TRIGGERED OUTPUT

[75] Inventors: Gunther Kaiser, Stuttgart; Winfried Klötzner, Maulbronn; Immanuel Krauter, Erbstetten; Edmund Jeenicke, Schwieberdingen, all of Fed. Rep. of Germany

[73] Assignee: Robert Bosch GmbH, Stuttgart, Fed. Rep. of Germany

[21] Appl. No.: 184,379

[22] Filed: Apr. 21, 1988

[30] Foreign Application Priority Data

May 6, 1987 [DE] Fed. Rep. of Germany ....... 3714998

[51] Int. Cl.⁵ .................. F02P 9/00; F02D 41/30
[52] U.S. Cl. .................. 364/431.03; 364/431.05;
 364/431.08; 364/222.4; 364/925; 123/480;
 123/417
[58] Field of Search ........ 364/431.05, 431.06,
 364/552, 709.01, 200 MS File, 900 MS File,
 431.03, 431.08; 340/825.5; 318/696; 123/480,
 417

[56] References Cited

U.S. PATENT DOCUMENTS

| | | | |
|---|---|---|---|
| 4,013,875 | 3/1977 | McGlynn | 364/200 |
| 4,214,307 | 7/1980 | Peterson, Jr. et al. | 364/431.06 |
| 4,282,574 | 8/1981 | Yoshida et al. | 364/900 |
| 4,307,450 | 12/1981 | Carp et al. | 364/431.05 |
| 4,381,447 | 4/1983 | Horvath et al. | 364/552 |
| 4,583,189 | 4/1986 | Koyama | 364/709.01 |
| 4,800,499 | 1/1989 | Ina et al. | 364/431.05 |

Primary Examiner—Gareth D. Shaw
Assistant Examiner—Gopal C. Ray
Attorney, Agent, or Firm—Frishauf, Holtz, Goodman & Woodward

[57] ABSTRACT

The resistance to supply voltage, e.g. battery, fluctuation of an input/output circuit for a control system, e.g. vehicular ignition/fuel injection system, is improved by placing a comparator K in each analog input line, and using a voltage divider UD to compensate the reference voltage $U_R$ applied to one of the comparator inputs. Processing speed is increased by using digital comparators 22-26, which test not only for threshold value equal to counter state, but also for threshold value greater than counter state, in the duty-cycle modification circuit. Chip count is reduced and integration is increased by using a single voltage divider to supply all the input comparators and by using a High-Speed Output (HSO) port on the central processing unit (CPU) to perform multiple output tasks.

4 Claims, 6 Drawing Sheets

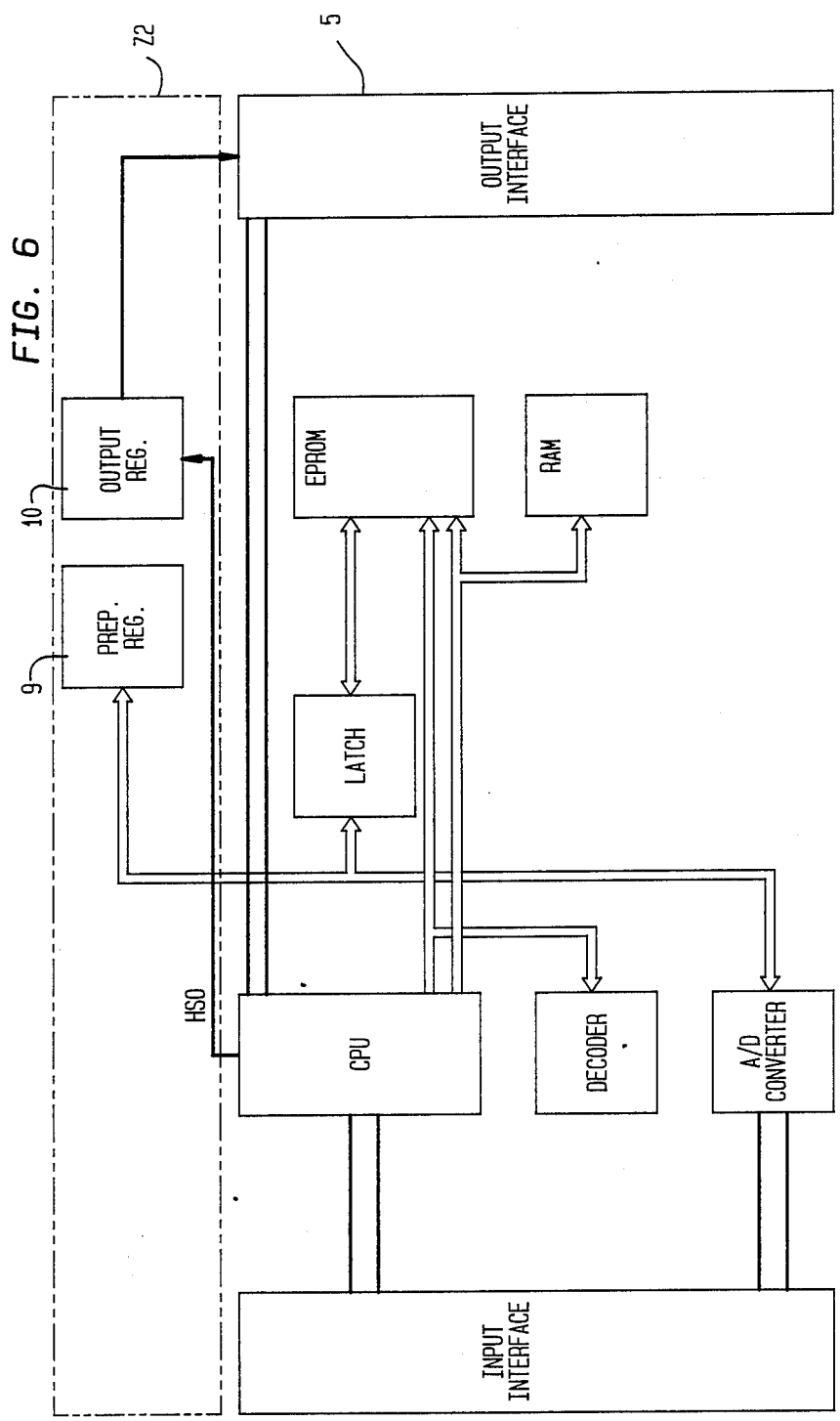

4,924,399

VEHICLE CONTROL SYSTEM WITH HSO-TRIGGERED OUTPUT

The present invention relates generally to computerized control systems which monitor analog signals or parameters, and, more particularly, to an automotive engine control system with improved resistance to supply voltage fluctuations.

BACKGROUND

It is well known that the voltage supplied by a vehicle battery to on-board control and data processing systems fluctuates according to temperature, load, battery age, proximity to overhead power lines, and other environmental factors, and that this tends to distort the measurements relied upon by the system in generating proper control signals. The input/output (I/0) circuits of such systems, especially in motor vehicles, typically use analog-operating comparators for recognition and preparation of input signals to the control circuits. These comparators monitor the relationships between various kinds of analog input signals and respective threshold values for each.

Depending upon a computer program and the operating states of the engine to be controlled, the input/output circuits generate variable duty cycles or keying ratios with programmable repetition rates, for example to match the output control signal rate to a changed engine RPM. In vehicular control systems, it is particularly important to generate a number of output signals at exactly specified times to, for example, optimally control fuel injection.

In conventional input/output circuits, a large number of discrete electronic components must be interconnected in order to carry out the multitude of signal processing and control tasks required.

THE INVENTION

Accordingly, it is an object of the present invention to render a control system input/output circuit resistant to supply voltage fluctuations. A further object is to reduce the number of discrete components which must be interconnected, and thereby to reduce assembly time and expense and to increase reliability.

Briefly, this is accomplished by providing in each input line a comparator which is supplied with a reference voltage which varies as the supply voltage fluctuates. Preferably, a single voltage divider can be used to provide a reference voltage for all the comparators. Further reduction in component count can be achieved by employing a central processing unit (CPU) with a high-speed output (HSO) port, and selectively coupling this port to a number of different other components.

A significant advantage of this circuit design is that the fluctuation-compensated reference voltage renders strong battery voltage swings, which occur in vehicles as operations and temperature vary, harmless to the precise monitoring of analog input signals. The reference voltage compensates correspondingly as battery voltage changes, so that even in the case of a supply voltage drop to half its normal value, the input signals, whose voltage also dips, can continue to be monitored. This is not possible with conventional comparators having constant reference voltages.

The compensated reference voltage is preferably produced by a voltage divider having two resistors and located between the battery voltage and ground. At the output thereof, one thus has reference voltage which varies with battery voltage. One voltage divider can be used to provide the reference voltage for multiple comparators, which enables a substantial reduction in the "chip count" or number of components.

In order to achieve the quickest possible reaction to varying thresholds, digital comparators are provided which test whether digital values at their inputs satisfy not only the "equality" condition, but also the "greater than" condition, and generate an output signal when the condition is satisfied. This has the advantage of responding more quickly than conventional digital comparators, which test only for equality, to changes in threshold values. This is particularly advantageous when the threshold is compared with the values supplied by a downcounter, thereby determining a specific keying ratio or duty cycle of the output signal of the digital comparator. Thus, if the threshold changes, the keying ratio of the digital comparator of the invention changes at an earlier point in time than does that of a conventional comparator.

One downcounter output can be applied to inputs of multiple digital comparators, so they can produce differing keying ratios by application of differing digital threshold values, without requiring multiple downcounters.

Conventional integrated input/output circuits provide only a limited number of high-speed outputs (HSO), and this number is often inadequate, particularly for control applications in motor vehicles. These HSO-ports in an input/output circuit can be extended by providing a supplemental output register or output latch between an output interface and internal data lines, the HSO-port signal being applied to the preparatory input of the register or latch. A further preparatory register can be placed upstream of the output register, so that when an HSO-signal occurs, the output register immediately passes its contents to the output interface and simultaneously receives the content of the preparatory register. This makes possible, to a greater extent, a precisely timed processing and transmission of control information.

These features make it possible to achieve, in an input/output circuit, such a high degree of integration that all functions can be integrated onto a single chip.

DRAWINGS

An illustrative embodiment is set forth in the drawings, of which:

FIG. 5 and FIG. 6 are block diagrams of circuits having additional registers for extending the use of the HSO-ports; and FIG. 7 is a pulse or timing diagram of different signals occuring in a six-cylinder engine.

DETAILED DESCRIPTION

Figure 1:
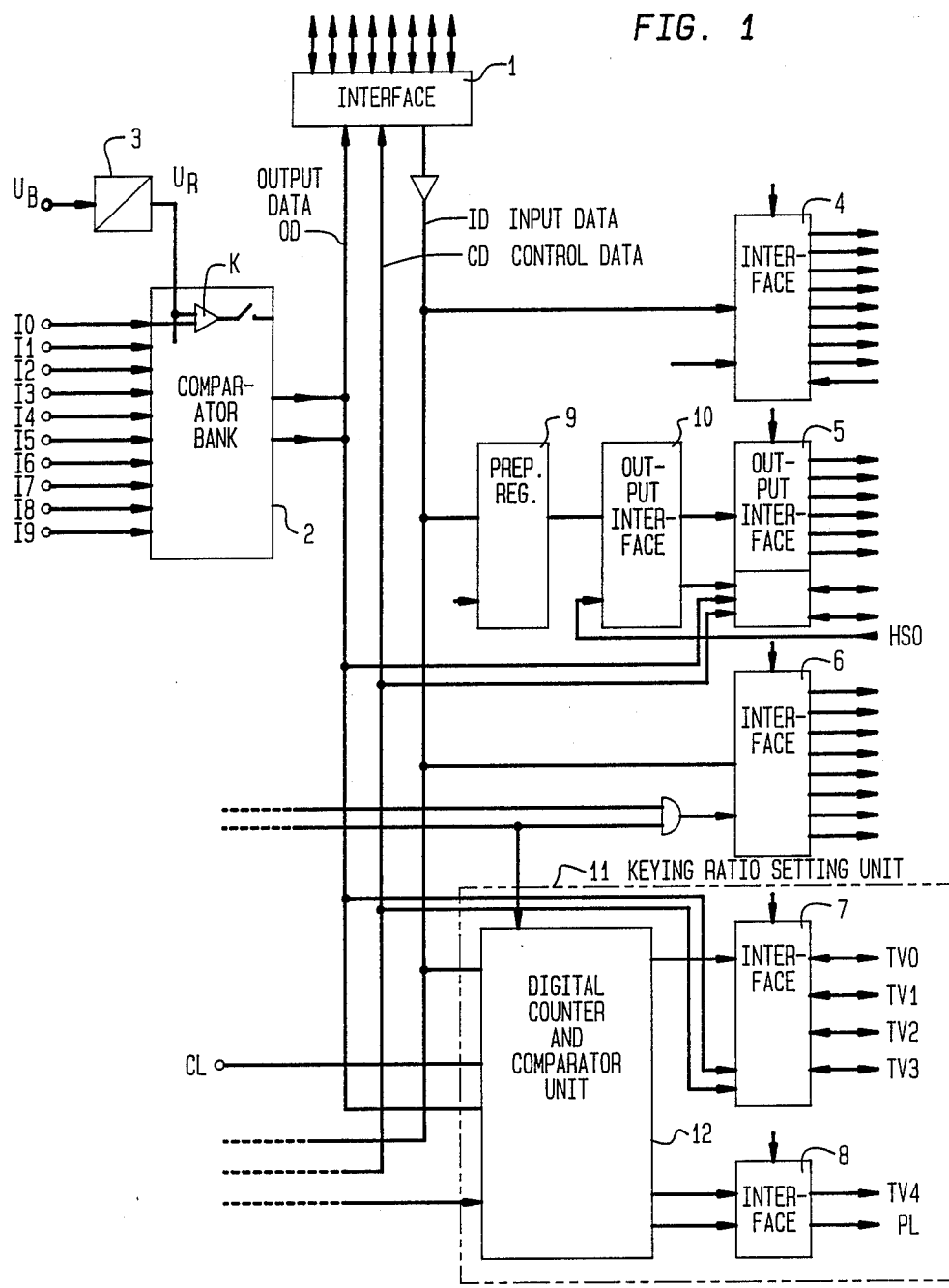
FIG. 1 is a block diagram of an input/output circuit according to the invention.

The circuit shown in FIG. 1 has a bi-directional interface 1, to which are connected data buses OD (Output Data), CD (Control Data), and ID (Input Data). Bus OD and the other buses are preferably, but not necessarily 8-bit parallel buses. OD is the Output Data bus, ID handles the data coming in via interface 1, and CD is the Control Data bus.

Analog input signals I0 through I9 are compared with a reference voltage $U_R$ in a comparator bank 2 containing multiple comparators K, of which one is shown. The reference voltage $U_R$ is derived from battery voltage $U_B$ in a voltage converter, which can be in the form of a voltage divider. The structure of comparator circuit 2 is shown in greater detail in FIG. 4.

Figure 2:
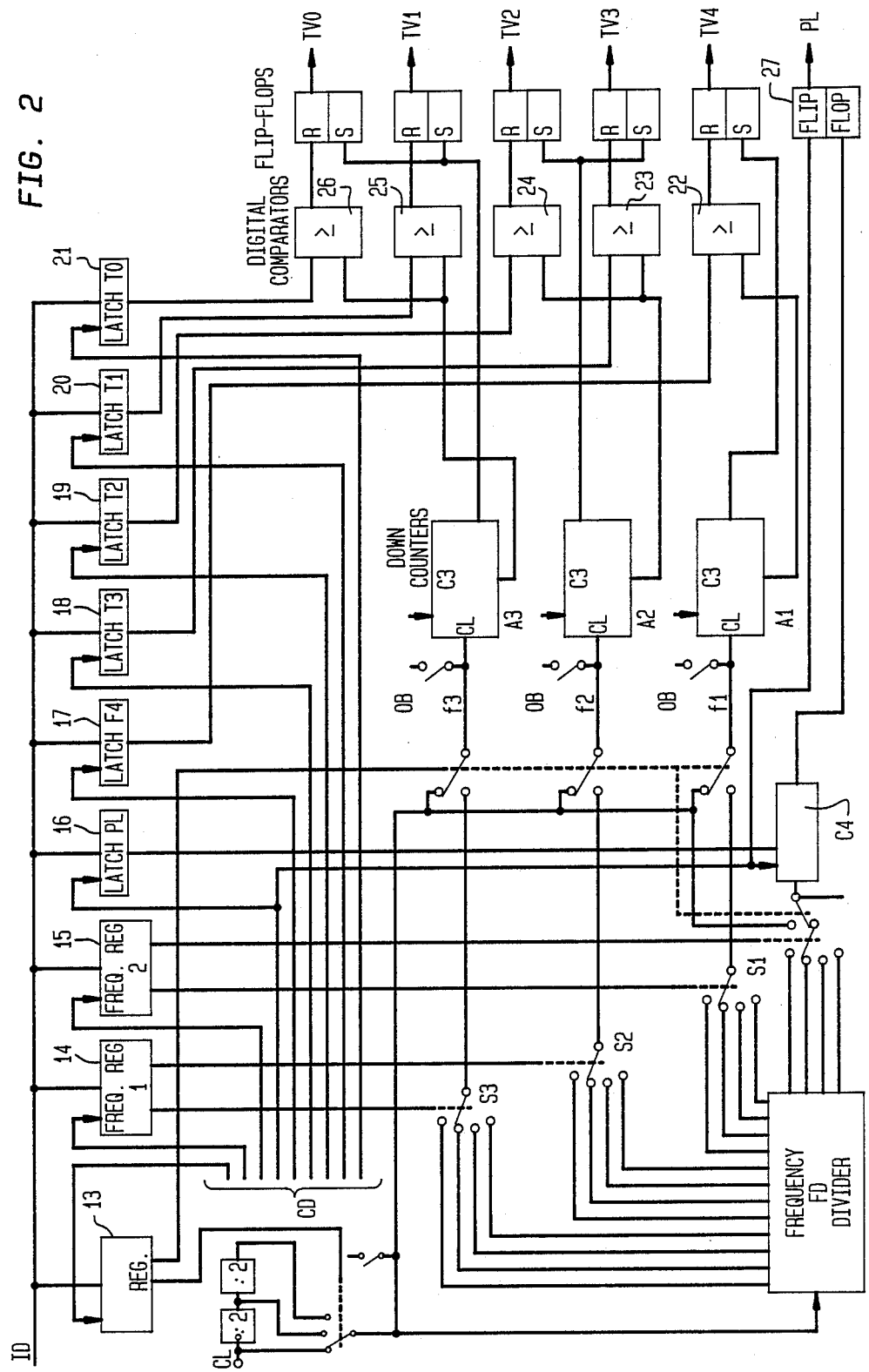
FIG. 2 is a detailed block diagram of a circuit, shown in FIG. 1, for setting differing keying ratios or duty cycles.

FIG. 2 shows how Input Data bus ID feeds a plurality of registers 13 through 21, of which registers or latches 17 through 21 have respective outputs connected to respective inputs of digital comparators 22 through 26. The other inputs of digital comparators 22 through 26 are connected respectively to outputs of counters C1 through C3. The output of C2 is connected to inputs of both 23 and 24, and the output of C3 is connected to inputs of both 25 and 26. Digital comparators 22–26 compare the digital threshold values stored in registers 17 through 21 with the respective actual count states of counters C1 through C3, which are in the form of downcounters. Whenever the threshold value is greater than or equal to the associated count state, the respective digital comparator applies an output signal to its downstream RS flip-flop. Thus, at the flip-flop outputs TV0 through TV4 are control signals with differing keying ratios or duty cycles which depend upon, among other factors, the respectively set digital threshold values.

The respective clock inputs CL of counters C1–C3 receive a signal whose frequency is determined by an upstream Frequency Divider FD. Respective switches S1–S3 between FD and the clock inputs permit selection among frequencies f1–f3 produced by FD.

Another clock signal CL, shown at the left edge of FIG. 2, is applied to the input of the Frequency Divider, and converted therein to various frequencies which are also applied to a further downcounter C4 and a further flip-flop 27 to generate another output signal PL.

Figure 3:
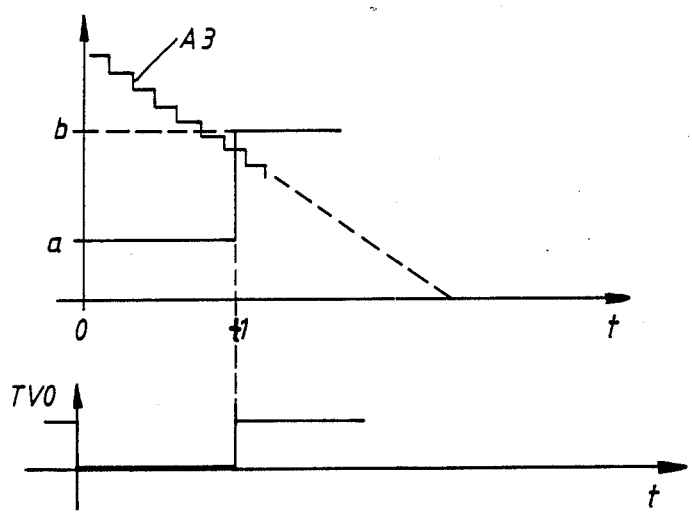
FIG. 3 illustrates two of the signals generated in the circuit of FIG. 2.

FIG. 3 shows two different signals at the same time scale. The upper diagram illustrates the output signal A3 of downcounter C3, while the lower diagram illustrates the output signal TV0 of the flip-flop fed by comparator 26. At time $t_1$, the original threshold value a stored in register 21 changes to value b, which is higher than the instantaneous count state at output A3. Digital comparator 26 (FIG. 2) determines at time $t_1$ that threshold value b is above the instantaneous count state and thus generates an output signal, which toggles the signal at output TV0 to the value "1" or HIGH. The other digital comparators 22–26 operate the same way with downcounters C1 to C3, so that signals with differing duty cycles are obtained at respective outputs TV0 through TV4 of the flip-flops.

Figure 4:
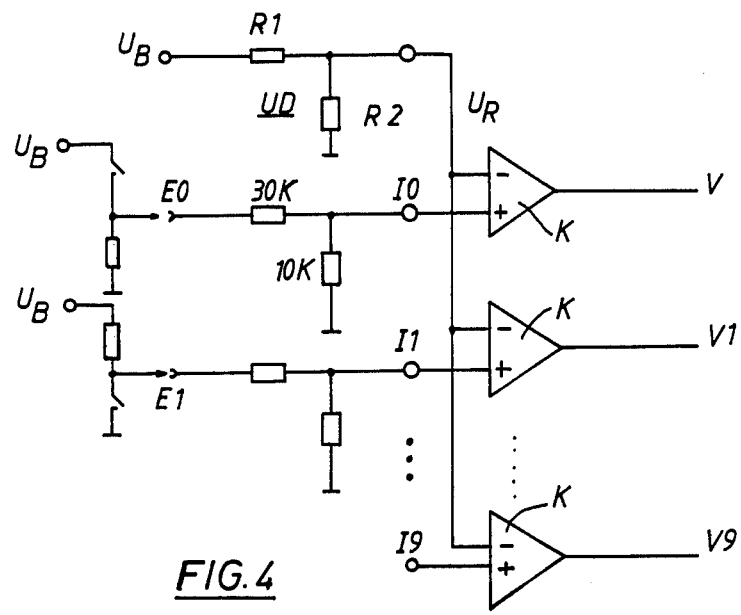
FIG. 4 illustrates comparators having a battery-voltage-independent reference voltage.

FIG. 4 partially illustrates in detail the comparator bank 2 of FIG. 1, with inputs I0 through I9. Battery voltage $U_B$ is reduced to reference voltage $U_R$ is a voltage divider UD comprising two resistors R1 and R2. This reference voltage $U_R$ is applied to the negative inputs of multiple comparators K, to whose other inputs are applied respective measurement signals, switching signals, or the like, as input signals E0,E1. These are likewise reduced to lower values by respective voltage dividers, such as the 30K resistor and 10K resistor shown. For example, input signal E0 could be the voltage of the starter relay of the engine, while E1 could be the voltage at the brake light of a motor vehicle. In this manner, one can monitor the functional readiness or operating condition of a variety of electrical devices on board the vehicle. Since the voltages applied to the respective inputs of the comparators for comparison are equally dependent upon the battery voltage $U_B$, they are subjected equally to whatever battery voltage fluctuates occur. The outputs V0 through V9 place characteristic condition signals onto the Output Data bus OD shown in FIG. 1.

Figure 5:
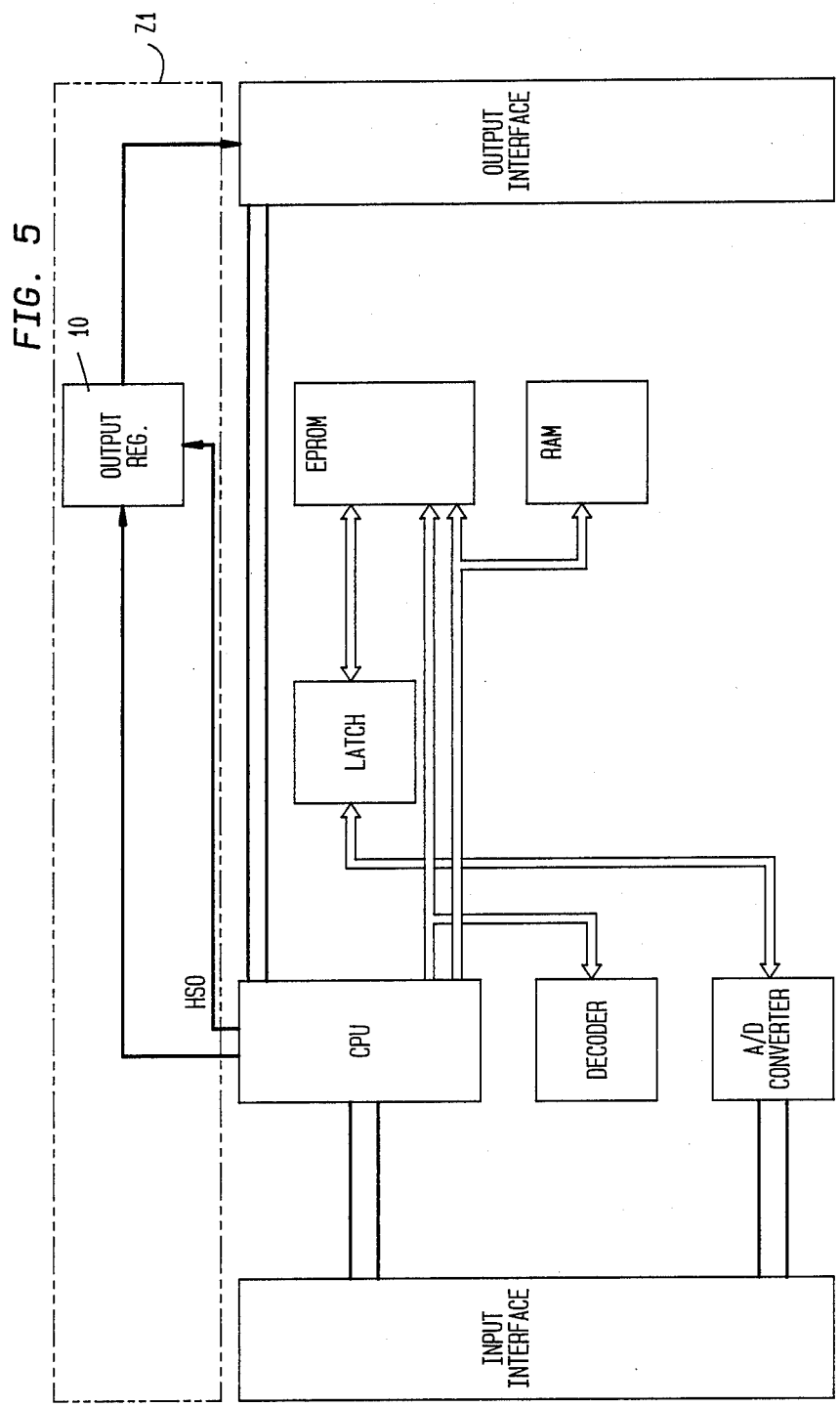

FIGS. 5 and 6 are block diagrams of circuits having, in FIG. 5, a supplemental output register 10, and, in FIG. 6, a supplemental preparatory register 9. The Latch-Enable input of output register or latch 10 is connected to the HSO port of a central processing unit (CPU) which controls data transmission and the data passing through the HSO port. These supplemental circuits Z1, shown by the dashed box in FIG. 5, and Z2, shown by the dashed box in FIG. 6, make possible extension of the use of the HSO port and assure fast signal processing and transmission.

The remaining elements of the circuits of FIGS. 5 and 6 are an input interface EI, an Analog-to-Digital converter AD, a decoder DC, a register or latch L, an EPROM, a RAM, and an output interface AI. The various elements are interconnected by data buses, e.g. 8 or 16 bits wide, and an address bus, preferably 16 bits wide.

A suitable CPU is the Intel microprocessor 8097BH. A suitable decoder is the RCA integrated circuit 74HCT138. A suitable 32K x 8 EPROM is the Intel 27C256, and a suitable RAM is the NEC uPD4464. Various modifications are possible within the scope of the inventive concept.

FIG. 7 is a diagram of engine impulses IP1 through IP9: IP1 is the crankshaft signal, IP2 is the camshaft signal, IP3–IP8 are the respective ignition signals for the 6 ignition lines of the 6-cylinder engine; and IP9 is the trigger signal of the High-Speed Output (HSO) port. All the diagrams IP1–IP9 are shown on the same timescale.

The HSO signal is a trigger signal which is crankshaft signal synchronous or otherwise represents a real-time signal. At each time shown as "1", the HSO trigger signal (IP9) toggles between "0" and "1". Each time, data earlier stored in preparatory register 9 and representing the condition of the ignition lines (IP3–IP8) appears at the output of output register 10. This process is not influenced by any "interrupt" loading of the CPU, and thus occurs exactly at the predetermined time.

The voltage change of the HSO port takes priority over an interrupt of lower priority, which assures that other interrupts occuring at time "1" are not hindered in their execution. This HSO interrupt is processed by the CPU beginning at time "2". At this time, the potential of the Latch-Enable of output register 10 is reset from "1" to "0" and the data characteristic of the next ignition instant are written into preparatory register 9. This writing into preparatory register 9 can also occur at a later time if that is better for the execution of the real-time program. In any event, it must be over before the next toggling from "0" to "1" at the Latch-Enable input of output register 10.

In this manner, the exact generation or output of multiple events is possible using a single HSO port, without degrading the real-time execution of the control program.

For the sake of simplicity, the connecting buses and data buses between the various elements are drawn in some cases as single lines, although these buses actually comprise multiple parallel conductors, such as those usually provided for parallel data transmission.

Various changes and modifications are possible within the scope of the inventive concept, and any of the features shown in connection with one of the embodiments could be used in another of the embodiments.

We claim:

1. An output circuit for a vehicular control system performing regularly recurring ignition and fuel injection tasks and having
   a microprocessor central processing unit (CPU) with a plurality of control outputs and a High-Speed Output (HSO) port;
   an output interface (t, AI); and
   an Internal Data bus (ID) interconnecting said microprocessor and said output interface,
   comprising,
   an output register (10) having a plurality of data inputs, a latch-enable input connected to said HSO port of said CPU, and outputs connected to said output interface (5, AI); and
   a preparatory register (9) having a plurality of inputs, and an output connected directly to said output register (10), connected in said Internal Data bus (ID) between said CPU and said output register (10);
   said preparatory register (9) accepting and storing data from said CPU, said stored data being transferred directly from said register (9) to said output register (10) in response to a transfer signal from said CPU, said transfer signal being generated periodically in connection with said regularly recurring ignition and fuel injection tasks, thereby making all said stored data available simultaneously to said output interface (5, AI).

2. Output circuit according to claim 1, wherein said transfer signal is a trigger signal generated in synchrony with crankshaft rotation.

3. An output circuit for a vehicular control system performing regularly recurring ignition and fuel injection tasks and having
   a microprocessor central processing unit (CPU) with a plurality of control outputs;
   an output interface (5, AI); and
   a data bus interconnecting said CPU and said output interface; and
   an output register (10) interposed, in said data bus, between said CPU and said output interface,
   comprising,
   preparatory registers (17-21) interposed between said CPU and said output register (10) and accepting and storing data from said CPU;
   a plurality of counters (C1-C3); and
   a plurality of comparators (22-26), each having one input connected to an output of a respective one of said preparatory registers and another input connected to an output of one of said counters,
   said output register (10) being switched in dependence upon a comparison between values stored in said counters and values stored in said preparatory registers (17-21).

4. Output circuit according to claim 3, wherein at least one of said counters (C2, C3) is connected to multiple ones of said comparators (23-26), and said counters have different respective clock rates.

* * * * *